United States Patent
Yamauchi et al.

(10) Patent No.: US 11,703,798 B2
(45) Date of Patent: Jul. 18, 2023

(54) LIGHT MODULATION ELEMENT AND INFORMATION RECORDING MEDIUM

(71) Applicant: DAI NIPPON PRINTING CO., LTD., Tokyo-to (JP)

(72) Inventors: Tsuyoshi Yamauchi, Tokyo-to (JP); Mitsuru Kitamura, Tokyo-to (JP); Nobuko Oikawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 685 days.

(21) Appl. No.: 16/464,027

(22) PCT Filed: Nov. 24, 2017

(86) PCT No.: PCT/JP2017/042183
§ 371 (c)(1),
(2) Date: May 24, 2019

(87) PCT Pub. No.: WO2018/097238
PCT Pub. Date: May 31, 2018

(65) Prior Publication Data
US 2019/0384222 A1 Dec. 19, 2019

(30) Foreign Application Priority Data
Nov. 24, 2016 (JP) .................. 2016-228229

(51) Int. Cl.
*G03H 1/00* (2006.01)
*G03H 1/02* (2006.01)
(Continued)

(52) U.S. Cl.
CPC ......... *G03H 1/0011* (2013.01); *G03H 1/0248* (2013.01); *G03H 1/16* (2013.01);
(Continued)

(58) Field of Classification Search
CPC .. G03H 1/0005; G03H 1/0011; G03H 1/0248; G03H 1/16; G03H 1/24;
(Continued)

(56) References Cited

U.S. PATENT DOCUMENTS 5,153,670 A * 10/1992 Jannson ................ G01J 3/1838
356/301
5,455,693 A   10/1995 Wreede et al.
(Continued)

FOREIGN PATENT DOCUMENTS

JP   H06-313812 A   11/1994
JP   H10-153943 A   6/1998
(Continued)

OTHER PUBLICATIONS

May 28, 2019 International Preliminary Report on Patentability issued in International Patent Application No. PCT/JP2017/042183.
(Continued)

*Primary Examiner* — Stephone B Allen
*Assistant Examiner* — Jyotsna V Dabbi
(74) *Attorney, Agent, or Firm* — Oliff PLC

(57) ABSTRACT

An optical member utilizing light from a point light source is enabled to visually perceive a reproduced optical image with a desired color. An optical modulation device includes an optical member having a light control part to reflect or absorb light in a predetermined wavelength and to pass through light in other than the predetermined wavelength in light in at least a visible light band, in accordance with a reproduction reference image for reproducing an original image, and a light transmissive part to pass through light in at least the visible light range including the predetermined wavelength.

17 Claims, 12 Drawing Sheets

(51) Int. Cl.
   *G03H 1/16* (2006.01)
   *G03H 1/24* (2006.01)
   *B42D 25/328* (2014.01)
   *B42D 25/378* (2014.01)

(52) U.S. Cl.
   CPC ............. *G03H 1/24* (2013.01); *B42D 25/328* (2014.10); *B42D 25/378* (2014.10); *G03H 2222/12* (2013.01); *G03H 2222/17* (2013.01)

(58) Field of Classification Search
   CPC .... G03H 1/024; G03H 1/0272; G03H 1/0276; G03H 1/22; G03H 1/2202; G03H 1/2286; G03H 1/2289; G03H 1/2249; G03H 2222/17; G03H 2222/12; G03H 2001/0212; G03H 2001/026; G03H 2001/0292; G03H 2001/0296; G03H 2001/2223; G03H 2001/2228; G03H 2001/2231; G03H 2001/2234; G03H 2001/2263; G03H 2001/2268; G03H 2001/262; G03H 2001/0016; G03H 2001/0027; G03H 2250/33; G03H 2250/42; G02B 5/32; B42D 25/328; B42D 25/378; B42D 25/351; B42D 25/29; B42D 25/355; B42D 2033/20
   USPC .......................................................... 359/10
   See application file for complete search history.

(56) References Cited

U.S. PATENT DOCUMENTS

| | | | | |
|---|---|---|---|---|
| 5,549,953 | A * | 8/1996 | Li | G07D 7/004 428/64.1 |
| 6,366,371 | B1 | 4/2002 | Kodama et al. | |
| 2002/0015836 | A1 * | 2/2002 | Jonza | G02B 5/3083 428/216 |
| 2007/0070477 | A1 * | 3/2007 | Eto | G03H 1/0005 359/12 |
| 2007/0183011 | A1 * | 8/2007 | Yamauchi | G03H 1/26 359/22 |
| 2008/0259417 | A1 * | 10/2008 | Wiltshire | G03H 1/18 359/3 |
| 2010/0027082 | A1 * | 2/2010 | Wiltshire | G03H 1/24 359/2 |
| 2010/0033779 | A1 * | 2/2010 | Kurashige | G02B 5/32 359/2 |
| 2013/0003151 | A1 * | 1/2013 | Takemori | G03H 1/202 359/30 |
| 2013/0170007 | A1 * | 7/2013 | Kurashige | G02B 27/48 359/24 |
| 2017/0308036 | A1 | 10/2017 | Kitamura et al. | |
| 2018/0229534 | A1 * | 8/2018 | Suzuki | G02B 5/32 |

FOREIGN PATENT DOCUMENTS

| | | | |
|---|---|---|---|
| JP | 2000-347555 A | 12/2000 | |
| JP | 2004-126535 A | 4/2004 | |
| JP | 2007-041545 A | 2/2007 | |
| JP | 2013-092624 A | 5/2013 | |
| JP | 5206915 B2 | 6/2013 | |
| JP | 2016-085355 A | 5/2016 | |
| JP | 2016-090659 A | 5/2016 | |
| JP | 2016-117185 A | 6/2016 | |
| WO | WO-2010072339 A2 * | 7/2010 | ............. B42D 25/29 |
| WO | 2016/034274 A1 | 3/2016 | |
| WO | 2016/068091 A1 | 5/2016 | |

OTHER PUBLICATIONS

Dec. 1, 2020 Office Action issued in Chinese Patent Application No. 201780072517.3.
Dec. 26, 2017 Search Report issued in International Patent Application No. PCT/JP2017/042183.
Apr. 1, 2022 Office Action issued in Japanese Patent Application No. 2018-552970.

* cited by examiner

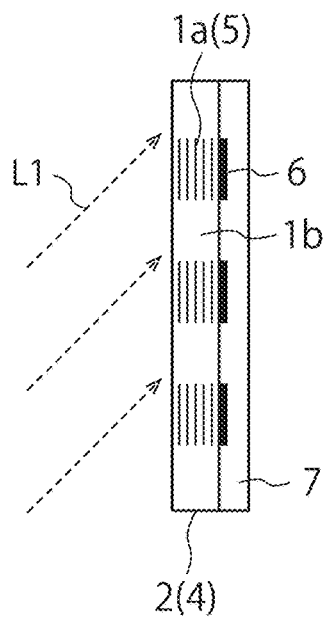
FIG. 8
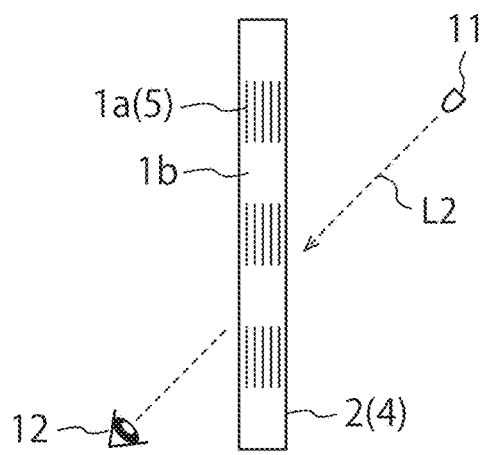
FIG. 9A
FIG. 9B

LIGHT MODULATION ELEMENT AND INFORMATION RECORDING MEDIUM

TECHNICAL FIELD

The present disclosure relates to a light modulation element and an information recording medium utilizing thereof.

BACKGROUND ART

A technique to irradiate a Fourier-transformed hologram with light from a point light source to create an optical image has been proposed (see, Japanese Laid-Open Patent No. 2004-126535, Japanese Laid-Open Patent No. 2016-85355, and Japanese Laid-Open Patent No. Hei 10-153943). When illuminated with the point light source, an optical image emerges and is visually perceived around the irradiation point of the point light source, and hence the optical image can be used in authenticity determination and the like by making, for example, security information emerge as an optical image.

DISCLOSURE OF INVENTION

Japanese Laid-Open Patent No. Hei 10-153943 discloses a Fourier-transformed hologram that is a light modulation element produced by creating a Fourier-transformed image of an original image and binarizing the Fourier-transformed image using a computer, and arranging a plurality of binarized Fourier-transformed images on a film, as a transparent-and-black pattern. In order to reproduce an optical image, a point light source is disposed behind the film to observe the point light source through the film. In this way, a point-symmetrical image can be visually perceived around the point light source, in accordance with the Fourier-transformed image in the film.

However, in reproduction, when the Fourier-transformed hologram is irradiated with white light including a plurality of wavelength components, there is a problem in that a reproduced optical image is observed with a rainbow color caused by chromatic dispersion. Especially, in the case where the size of the reproduced optical image is small, when the reproduced optical image is observed with the rainbow color caused by chromatic dispersion, visual perception of the reproduced optical image is reduced. Therefore, in the case where the reproduced optical image represents letters, symbols, etc., the letters, symbols, etc. may not be correctly recognized due to chromatic dispersion.

The present disclosure is to solve the above-described problem and its purpose is to provide a light modulation element and an information recording medium, enabling visual perception of a reproduced optical image with a desired color when observing an optical member utilizing light from a point light source.

In order to solve the above-described problem, one aspect of the present disclosure provides a light modulation element comprising an optical member, the optical member comprises a light control part to reflect or absorb light in a predetermined wavelength and to pass through light in other than the predetermined wavelength in light in at least a visible light range in accordance with a reproduction reference image for reproducing an original image; and a light transmissive part to pass through light in at least the visible light range including the predetermined wavelength.

The reproduction reference image may be a Fourier-transformed image of the original image.

The optical member may comprise a hologram recording layer, and
the light control part may be an interference fringe in the hologram recording layer.

The optical member may make an observer visually perceive a reproduced optical image of a color of the predetermined wavelength when a point light source is observed through a predetermined region including the interference fringe in the hologram recording layer from a normal direction to the optical member in a state where light in a predetermined wavelength range including the predetermined wavelength is incident from the point light source on the predetermined region, and may make an observer visually perceive a reproduced optical image of a color of a shorter wavelength than the predetermined wavelength when the point light source is observed through the predetermined region from a direction oblique to the normal direction.

The optical member may make an observer visually perceive a reproduced optical image of a color of the predetermined wavelength when a point light source is observed through a predetermined region including the interference fringe in the hologram recording layer from a direction oblique to a normal direction to the optical member in a state where light in a predetermined wavelength range including the predetermined wavelength is incident from the point light source on the predetermined region, and may make an observer visually perceive a reproduced optical image of a color of a longer wavelength than the predetermined wavelength visually perceived when the point light source is observed through the predetermined region from a direction closer than the oblique direction to the normal direction.

The optical member may comprise;
a base material layer; and
a dielectric multilayer stacked on the base material layer,
wherein the light control part may be the dielectric multilayer.

The optical member may make an observer visually perceive a reproduced optical image of a color of the predetermined wavelength when a point light source is observed through the predetermined region including the dielectric multilayer from a normal direction to the optical member in a state where light in a predetermined wavelength range including the predetermined wavelength is incident from the point light source on the predetermined region, and may make an observer visually perceive a reproduced optical image of a color of a shorter wavelength than the predetermined wavelength when the point light source is observed through the predetermined region from a direction oblique to the normal direction.

The optical member may make an observer visually perceive a reproduced optical image of a color of the predetermined wavelength when the point light source is observed through the predetermined region including the dielectric multilayer from a direction oblique to a normal direction to the optical member in a state where light in a predetermined wavelength range including the predetermined wavelength is incident from the point light source on the predetermined region, and may make an observer visually perceive a reproduced optical image of a color of a longer wavelength than the predetermined wavelength when the point light source is observed through the predetermined region from a direction closer than the oblique direction to the normal direction.

The optical member may comprise;
a base material layer; and a predetermined-wavelength absorbing layer stacked on the base material layer, wherein the light control part may be the predetermined-wavelength absorbing layer.

The optical member may make an observer visually perceive a reproduced optical image of a color of the predetermined wavelength when the point light source is observed through the predetermined region including the predetermined-wavelength absorbing layer, in a state where light in a predetermined wavelength range including the predetermined wavelength is incident from a point light source on a predetermined region.

A half width of spectral transmittance in the predetermined wavelength is 100 nm or less in a state where light in a predetermined wavelength range including the predetermined wavelength is incident from a point light source on the optical member along a normal direction to the optical member.

An information recording medium comprising the above-described light modulation element may be provided.

The original image may include information such as a letter, a symbol and a pattern.

A base material having an opening of a predetermined size may be provided, wherein at least part of the light modulation element may be disposed in the opening.

According to the present disclosure, a reproduced optical image can be visually perceived with a desired color when an optical member is observed utilizing light from a point light source.

BRIEF DESCRIPTION OF DRAWINGS

FIG. 8 is a drawing showing another example of forming interference fringes in a hologram recording layer;

FIG. 9A is a drawing showing an example of observing an reproduced optical image by means of the hologram recording layer of FIG. 8;

FIG. 9B is a drawing showing an example of the reproduced optical image of FIG. 9A;

BEST MODE FOR CARRYING OUT THE INVENTION

Hereinbelow, an embodiment of the present disclosure will be explained with reference to the accompanying drawings. In the accompanying drawings of the present specification, for simplicity in drawings and easy understanding, the scale, the ratio of height to width, etc. are modified to be exaggerated from those of actual ones.

Moreover, the terms such as "parallel", "intersect", and "the same", and the values of, for example, length and angle, which define shape, geometrical condition, and the degree of shape and geometrical condition, used in the present specification, are not necessary be limited to their strict definitions, but are interpreted to include the range to the extent that a similar function can be expected.

Figure 1:
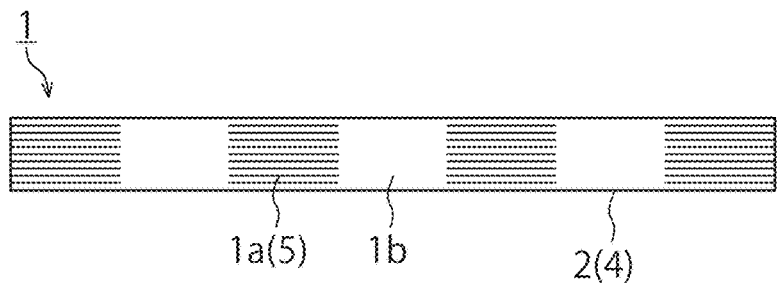
FIG. 1 is a schematic sectional view of a light modulation element 1 according to an embodiment of the present disclosure.

FIG. 1 is a schematic sectional view of a light modulation element 1 according to an embodiment of the present disclosure. The light modulation element 1 of FIG. 1 is provided with an optical member 2 having a light control part 1a and a light transmitter 1b. The light control part 1a reflects or absorbs light in a predetermined wavelength and passes through light in other than the predetermined wavelength in at least a visible light band, in accordance with a reproduction reference image for reproducing an original image. The reproduction reference image is an image having intensity distribution or phase distribution of light in accordance with the original image, which is, for example, a Fourier-transformed image of the original image. The light transmitter 1b passes through light in at least the visible light range including the predetermined wavelength. The visible light range is a wavelength range from, for example, 360 nm to 830 nm. The predetermined wavelength is in part of wavelength bands in the visible light band. The wavelength range of the predetermined wavelength in the present disclosure is a wavelength range on both sides of a half width of spectral transmittance in the light control part 1a. The half width of spectral transmittance is defined, as described later, as the difference between wavelengths before and after, and closest to a wavelength at which a transmission factor becomes smallest, the transmission factor being (b+a)/2 where b is a transmission factor (%) of the optical member 2, the transmission factor being assumed when the light control part 1a is not formed, in the wavelength at which the transmission factor becomes smallest, and a is a transmission factor (%) of the optical member 2 in the wavelength at which the transmission factor becomes smallest. As a specific example, the predetermined wavelength may be in a green-color wavelength range from 495 nm to 570 nm. In more preferably, the predetermined wavelength may be in a green-color wavelength range from 507 nm to 557 nm. As the wavelength range is narrower, monochromaticity of a reproduced optical image becomes higher to reduce blurring of the reproduced optical image due to chromatic dispersion, so that a clearly reproduced optical image can be observed and also a transmission wavelength range increases, so that the change in tone of the scene around the reproduced optical image becomes smaller when viewed through the light modulation element 1.

The optical member 2 may be a hologram recording layer 4 having the light control part 1a and the light transmitter 1b. The light control part 1a in the hologram recording layer 4 may be an interference fringe 5 in the hologram recording layer 4. It is more desirable for the optical member 2 to have a higher transmission factor in the visible light band. Specifically, the transmission factor is desirably 60% or higher, and especially, desirable to be 70% or higher. As the transmission factor of the optical member 2 is higher, the visual perception of an optical image by means of the optical member 2 becomes better. Here, the transmission factor is a value measured according to JIS K7361-1.

It is more desirable for the optical member 2 to have a lower haze value. Specifically, it is desirable for the haze value to be in the range of 0.01% to 5%, especially, 0.01% to 1.5%. As the haze value of the optical member 2 is smaller, the visual perception of an optical image by means of the optical member 2 becomes better. Here, the haze value is a value measured in conformity with JIS K7136.

The hologram recording layer 4 is, for example, formed by recording the interference fringe 5 on a volume hologram recording material. In this case, the interference fringe 5 corresponds to the light control part 1a. The hologram recording layer 4 includes a region where the interference fringe 5 is formed and a region where the interference fringe 5 is not formed. The region where the interference fringe 5 is not formed corresponds to the light transmitter 1b. The half width of spectral transmittance that represents the width of the predetermined wavelength passing through the hologram recording layer 4 is desirably 100 nm or less in order to improve color recognition performance to obtain a clearly reproduced optical image. In more preferably, the half width is desirably 50 nm or less.

There is no particular limitation on the volume hologram recording material as long as having a value in an allowable range of the above-described transmission factor and haze value. For example, a photosensitive material containing a silver-halide material, dichromic-acid gelatin emulsion, photo-polymerized resin, photo cross-linkable resin, a cationic-polymerized compound, a radically-polymerized compound, a photo-radical polymerization initiator, and a photo-cationic polymerization initiator, is used.

The interference fringe 5 inside the hologram recording layer 4 is formed by making light in the predetermined wavelength incident on the volume hologram recording material from a first direction. The first direction may be the normal direction to the optical member 2. In this case, the optical member 2 makes an observer visually perceive a reproduced optical image of a color of the predetermined wavelength when the point light source is observed through the predetermined region including the interference fringes 5 in the hologram recording layer 4 from the normal direction to the optical member 2 in the state where light in a predetermined wavelength range including the predetermined wavelength is incident from the point light source on a predetermined region, along the normal direction to the optical member 2. Moreover, the optical member 2 makes an observer visually perceive a reproduced optical image of a color of a shorter wavelength than the predetermined wavelength when the point light source is observed through the predetermined region from a direction oblique to the normal direction.

Here, the predetermined region is a region including the light control part 1a and the light transmitter 1b in accordance with the Fourier-transformed image in the hologram recording layer 4, which is a region through which a reproduced optical image can be visually perceived. The reproduced optical image cannot be visually perceived with the light control part 1a only or the light transmitter 1b only.

The above-described first direction may be a direction oblique to the normal direction to the optical member 2. In this case, the optical member makes an observer visually perceive a reproduced optical image of the color of the predetermined wavelength when the point light source is observed through the predetermined region including the interference fringe in the hologram recording layer 4 from the direction oblique to the normal direction to the optical member 2 in the state where the light in the predetermined wavelength range including the predetermined wavelength is incident from the point light source on the predetermined region. Moreover, the optical member makes an observer visually perceive a reproduced optical image of a color of a longer wavelength than the predetermined wavelength when the point light source is observed through the predetermined region from a direction closer than the oblique direction to the normal direction.

As the production method of the light modulation element 1 of FIG. 1, a plurality of production methods can be considered. Hereinbelow, representative two production methods will be explained in order.

Figure 2:
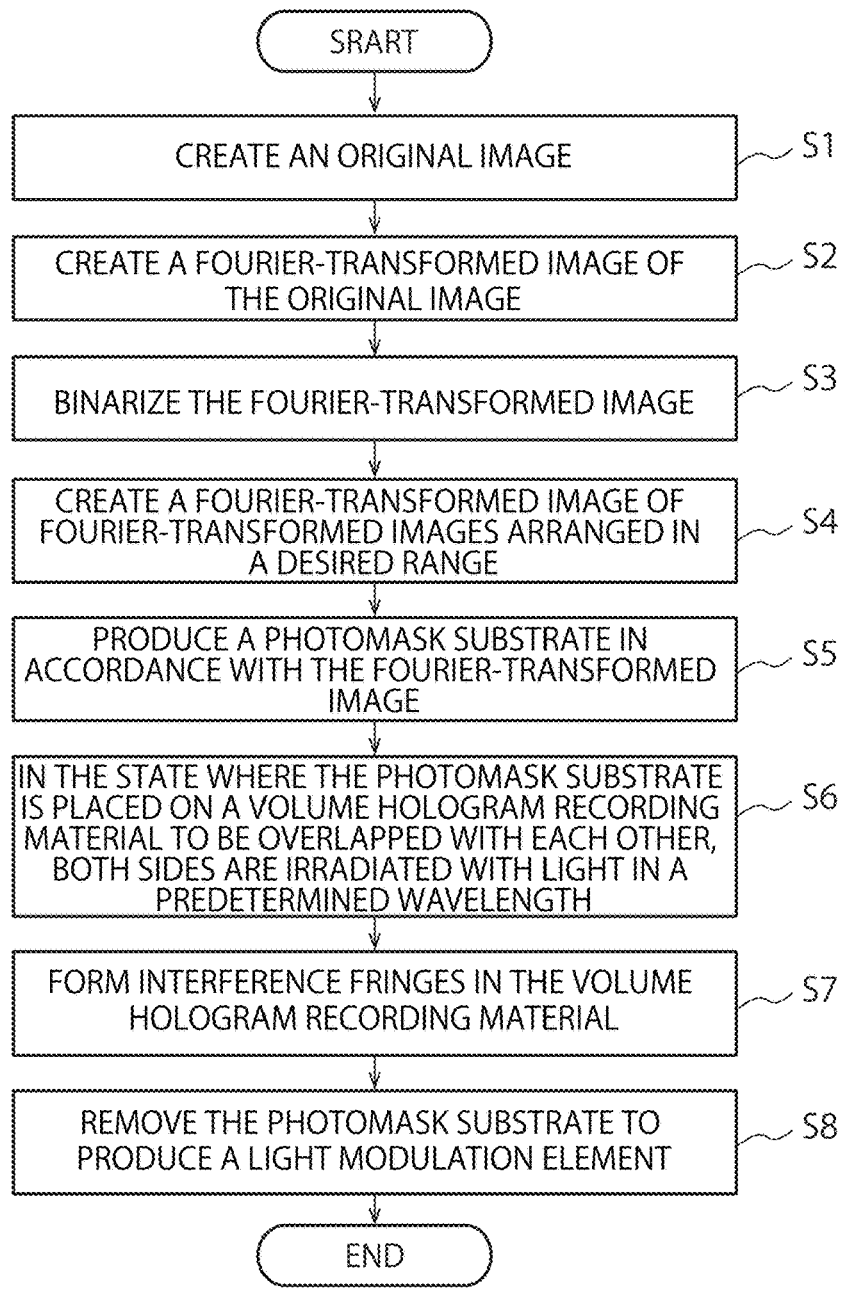
FIG. 2 is a flowchart showing one example of the procedure of a production method of the light modulation element 1.
Figure 3A:
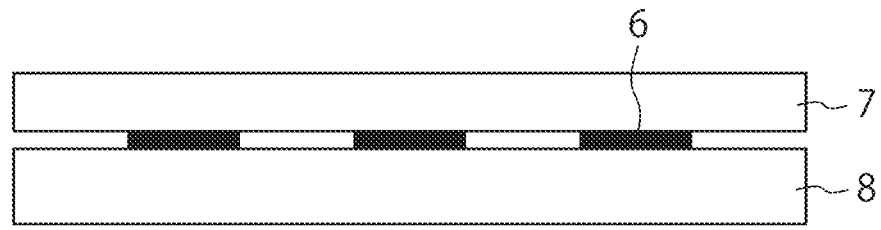
FIG. 3A is a process drawing explaining a first example of the production method of the light modulation element of FIG. 1.
Figure 3B:
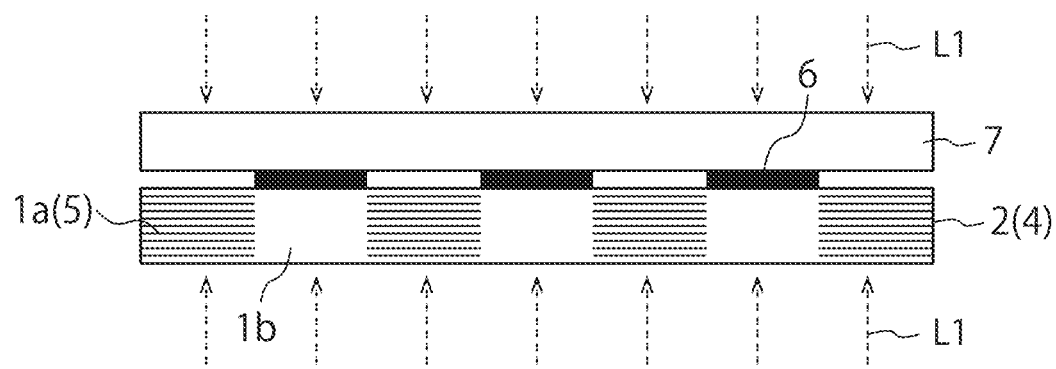
FIG. 3B is a process drawing following to FIG. 3A.
Figure 3C:
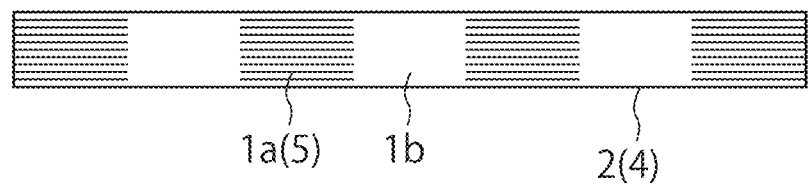
FIG. 3C is a process drawing following to FIG. 3B.

FIG. 2 is a flowchart showing one example of the procedure of the production method of the light modulation element 1. FIGS. 3A to 3C are process drawings corresponding to the procedure of FIG. 2. First of all, a Fourier-transformed image is created. The Fourier-transformed image is created with a process of Fourier transform or the like to an original image using a computer. Specifically, first of all, the original image is created on a personal computer (hereinbelow, PC) (step S1). The original image is any of letters, symbols, patterns, etc.

Subsequently, the Fourier-transformed image of the original image is created using a computer such as a PC (step S2). Then, the Fourier-transformed image is binarized (step S3). In detail, binarization is performed by examining the phase of the Fourier-transformed image per pixel of the Fourier-transformed image, and when the phase is in the range from −90° to +90°, assigning a certain value Tp, such as transparent, whereas, in the other cases, assigning a certain another value Tm, such as black or a mirror surface. The range for assigning Tp may be set other than the range from −90° to +90°.

Figure 4:
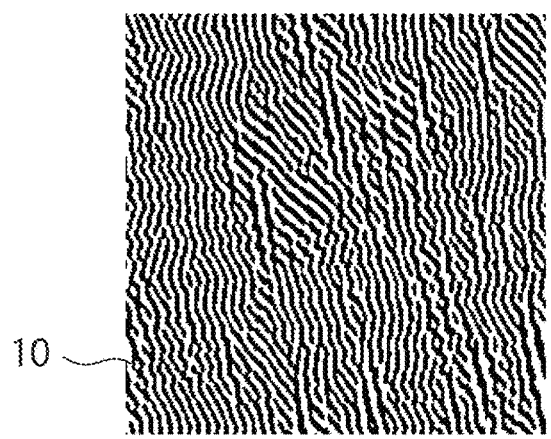
FIG. 4 shows one example of a Fourier-transformed image.

FIG. 4 shows one example of a Fourier-transformed image 10. The Fourier-transformed image 10 of FIG. 4 is binary data of black and white, but may be composed of multi-value data more than the binary data. An optical image reproduced based on the Fourier-transformed image 10 is a point-symmetrical optical image with respect to a predetermined center position. Subsequently, binarized Fourier-transformed images obtained in step S3 are arranged in a desired region (step S4). For example, a Fourier-transformed image is created by arranging four binarized Fourier-transformed images. Practically, the Fourier-transformed image is created by, for example, arranging 20 images of the smallest unit vertically and horizontally. In the following explanation, the Fourier-transformed image 10 includes images of the smallest unit such as in FIG. 4 arranged in a desired region.

Subsequently, a light absorbing layer or a reflecting layer is formed on a glass substrate to produce a photomask substrate 7 having the light absorbing layer or the reflecting layer patterned in accordance with the Fourier-transformed image 10 (step S5). For example, in white portions of the Fourier-transformed image 10 in FIG. 4, the light absorbing layer or the reflecting layer is etched away whereas, in black portions, the light absorbing layer or the reflecting layer is remained there, to produce the photomask substrate 7 having the Fourier-transformed image 10 recorded. Instead of producing the photomask substrate 7, in a production method of a printing plate making film using laser recording, the light absorbing layer may be patterned on a film base material in accordance with the Fourier-transformed image 10. Hereinbelow, an example using the photomask substrate 7 will be explained.

Subsequently, as shown in FIGS. 3A and 3B, in the state where the photomask substrate 7 is placed on the volume hologram recording material 8 to be overlapped with each other, both sides are irradiated with light in the predetermined wavelength (step S6). As the irradiation light, coherent light L1 with coherent phase and wavelength is used. In the irradiation light, light beams incident on light absorbing layers 6 in the photomask substrate 7 are absorbed and hence not incident on the volume hologram recording material 8 whereas light beams that pass through the portions in the photomask substrate 7 without the light absorbing layers 6, pass through the photomask substrate 7, as they are, to be incident on the volume hologram recording material 8. As shown in FIG. 3B, in the portions in the volume hologram recording material 8, which are not overlapped with the light absorbing layers 6, the light beams from both sides interfere with each other to form interference fringes 5 (step S7). The interference fringes 5 are formed in the portions which are not overlapped with the light absorbing layers 6 in the photomask substrate 7. The portion where a light absorbing layer 6 is formed corresponds to the light transmitter 1b. In between the interference fringes 5 adjacent to each other in the plane direction in the volume hologram recording material 8, the light transmitter 1b is disposed. Subsequently, as shown in FIG. 3C, the photomask substrate 7 is removed to obtain the light modulation element 1 (step S8).

Figure 5A:
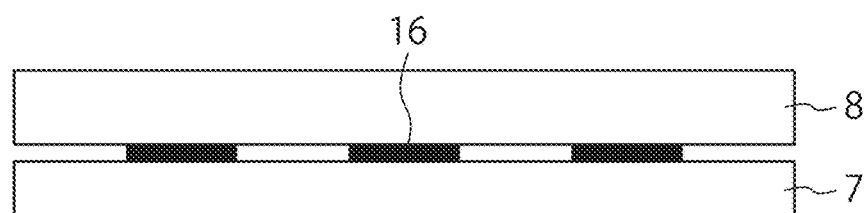
FIG. 5A is a process drawing explaining a second example of the production method of the light modulation element of FIG. 1.
Figure 5B:
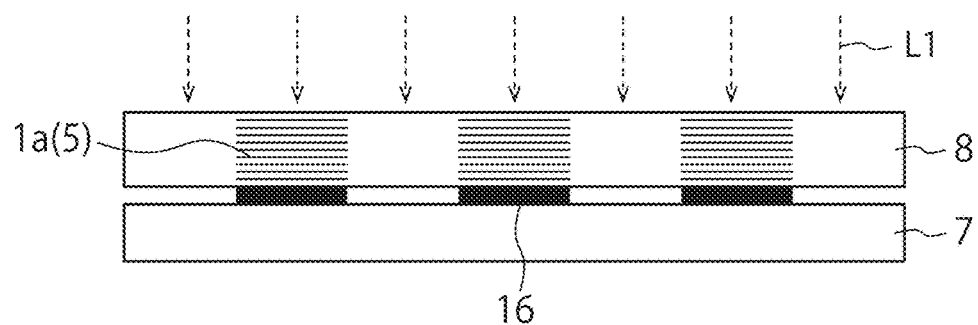
FIG. 5B is a process drawing following to FIG. 5A.
Figure 5C:
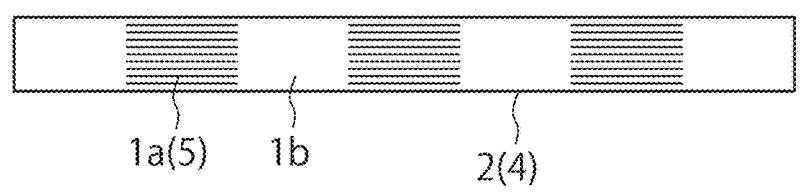
FIG. 5C is a process drawing following to FIG. 5B.

FIGS. 5A to 5C are process drawings explaining the other example of the production method of the light modulation element 1. First of all, as shown in FIG. 5A, different from FIG. 3, the photomask substrate 7 is disposed below the volume hologram recording material 8, and light in the predetermined wavelength is made incident from above the volume hologram recording material 8. In the second example, light is not required to be incident from below the volume hologram recording material 8. Also in FIG. 5, an example using a photomask substrate will be explained.

In the example of FIGS. 5A to 5C, when the light (incident light) in the predetermined wavelength incident on the volume hologram recording material 8 is incident on light reflection layers 16 in the photomask substrate 7, the light is reflected to travel upwards. The reflected light and the incident light interfere with each other to form interference fringes 5 in the volume hologram recording material 8 as shown in FIG. 5B. On the other hand, light incident on the portions in the volume hologram recording material 8 without the light reflecting layers 16 passes through the volume hologram recording material 8 and the photomask substrate 7 without interfering with other light, so that no interference fringes are formed. Accordingly, the interference fringes 5 in the volume hologram recording material 8 are formed in the portions which overlap with the light reflecting layers 16 in the photomask substrate 7. Thereafter, the photomask substrate 7 is removed to obtain the light modulation element 1 as shown in FIG. 5C.

In either of the production methods shown in FIGS. 3A to 3C and FIGS. 5A to 5C, the interference fringes 5 in accordance with the Fourier-transformed image 10 are formed in the volume hologram recording material 8. The interference fringes 5 reflect light in the predetermined wavelength whereas pass through light in other than the predetermined wavelength, corresponding to the light control part 1a. Having the light control part 1a and the light transmitter 1b in the region with no interference fringes 5, the light in the predetermined wavelength does not pass through the light control part 1a but passes through the light transmitter 1b to form a reproduced optical image, whereas the light in other than the predetermined wavelength passes through the light control part 1a and also the light transmitter 1b, thus not forming any reproduced optical images, so that the reproduced optical image is not visually perceived with a rainbow color. Therefore, according to the production methods of FIGS. 3A to 3C and FIGS. 5A to 5C, by providing the light control part 1a and the light transmitter 1b, a reproduced optical image of a monochrome color can be visually perceived.

Although in FIGS. 3A to 3C and FIGS. 5A to 5C, the examples in which the coherent light L1 is made incident on the photomask substrate 7 and the volume hologram recording material 8 from the normal direction to form the interference fringes 5 are shown, the coherent light L1 may be incident from a direction oblique to the normal direction to form the interference fringes 5, as described later.

Instead of using the volume hologram recording material 8, a dielectric multilayer may be used. In the case of producing the light modulation element 1 using the dielectric multilayer, for example, the dielectric multilayer is formed on a base material layer by deposition or vapor growth, and then a photomask substrate patterned in accordance with the Fourier-transformed image 10 is disposed on the dielectric multilayer to pattern the dielectric multilayer by etching in photolithography. Or instead of using the photomask substrate, a patterned dielectric multilayer may be formed on the base material layer by an electron-beam writing method or the like. In this case, the portion having the dielectric multilayer corresponds to the interference fringe 5 to become the light control part 1a. The portion without the dielectric multilayer corresponds to the light transmitter 1b. The half width of spectral transmittance that represents the width of the predetermined wavelength passing through the patterned dielectric multilayer is desirably 100 nm or less in order to improve color recognition performance to obtain a clearly reproduced optical image. More preferably, the half width is desirably 50 nm or less.

The optical member 2 including the dielectric multilayer makes an observer visually perceive a reproduced optical image of the color of the predetermined wavelength when the point light source 11 is observed through the predetermined region including the dielectric multilayer from the normal direction to the optical member 2 in the state where light in the predetermined wavelength range including the predetermined wavelength is incident from a point light source 11 on a predetermined region, and makes an observer visually perceive a reproduced optical image of a color of a shorter wavelength than the predetermined wavelength when the point light source 11 is observed from a direction oblique to the normal direction.

Or the optical member makes an observer visually perceive a reproduced optical image of the color of the predetermined wavelength when the point light source 11 is observed through the predetermined region including the dielectric multilayer from a direction oblique to the normal direction to the optical member 2 in the state where light in the predetermined wavelength range including the predetermined wavelength is incident from the point light source 11 on the predetermined region, and makes an observer visually perceive a reproduced optical image of a color of a longer wavelength than the predetermined wavelength when the point light source 11 is observed through the predetermined region from a direction closer than the oblique direction to the normal direction.

The light modulation element 1 according to the present embodiment can select the color of a reproduced optical image to be visually perceived by controlling the incident direction or wavelength of a laser beam to be used for forming the interference fringes 5 in the volume hologram recording material 8. Moreover, the color of a reproduced optical image to be visually perceived can be selected by controlling the inter-layer distance or the reflectivity of each layer of the dielectric multilayer. Furthermore, by changing the observation direction, the color of a reproduced optical image to be visually perceived varies.

Figure 6A:
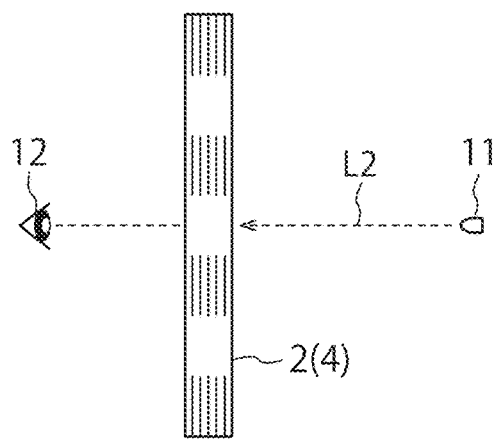
FIG. 6A is a drawing showing a method of observing a reproduced optical image of a hologram recording layer from a normal direction.

The above-described FIGS. 3A to 3C and FIGS. 5A to 5C show the examples of forming the interference fringes 5 inside the volume hologram recording material 8 by making the coherent light L1 of the predetermined wavelength incident on the volume hologram recording material 8 along the normal direction to the volume hologram recording material 8. FIG. 6A is a drawing showing a method of observing a reproduced optical image of the hologram recording layer 4 produced in FIGS. 3A to 3C or FIGS. 5A to 5C. In FIG. 6A, while light from the point light source 11 is being made incident on a predetermined region along the normal direction to the hologram recording layer 4, an observer 12 observes the point light source 11 through the predetermined region from the opposite surface side of the hologram recording layer 4 with respect to the point light source 11. The predetermined region is a region including the light control part 1a and the light transmitter 1b in accordance with the Fourier-transformed image in the hologram recording layer 4, which is a region through which a reproduced optical image can be visually perceived. The region having the interference fringe 5 formed therein is the light control part 1a whereas the region with no interference fringes 5 formed therein is the light transmitter 1b. The light from the point light source 11 is light in the predetermined wavelength range including the predetermined wavelength. As a more specific example, the light from the point light source 11 may be light in the predetermined wavelength or white light. When the observer observes the point light source through the predetermined region, the point light source 11 is not required to be the coherent light L1, but preferably be light including a relatively wide wavelength component such as LED light or a an incandescent lamp.

Figure 6B:
FIG. 6B is a drawing showing an example of the reproduced optical image of FIG. 6A.

In this case, as shown in FIG. 6B, the observer 12 can observe a reproduced optical image with the color of the predetermined wavelength. The interference fringe 5 of the present embodiment is the light control part 1a that does not pass through but reflects the light in the predetermined wavelength whereas passes though light in other than the predetermined wavelength. The region with no interference fringes 5 recorded is the light transmitter 1b that passes through the light in the predetermined wavelength and also the light in other than the predetermined wavelength. Therefore, the optical member 2 reflects and passes through light in accordance with the Fourier-transformed image for the light in the predetermined wavelength whereas only passes through the light in other than the predetermined wavelength. Accordingly, when the observer 12 observes the point light source 11 through the above-described predetermined region, the observer 12 can visually perceive a reproduced optical image with the color of the predetermined wavelength.

Figure 7A:
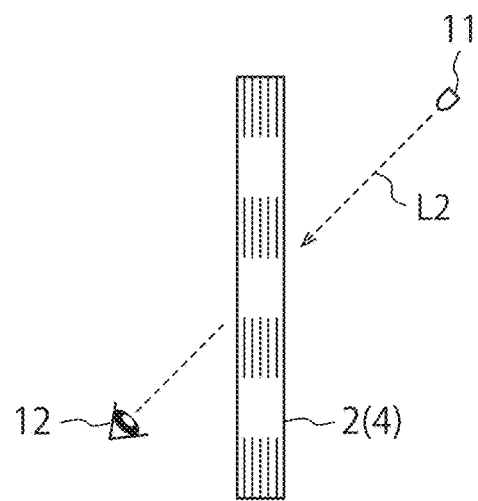
FIG. 7A is a drawing showing a method of observing a reproduced optical image of a hologram recording layer from a direction oblique to a normal direction.
Figure 7B:
FIG. 7B is a drawing showing an example of the reproduced optical image of FIG. 7A.

FIG. 7A shows an example in which the observer 12 observes the point light source 11 through the predetermined region along a direction oblique to the normal direction to the hologram recording layer 4. As shown in FIG. 7A, when the observer 12 observes the point light source 11 through the predetermined region at an oblique angle gradually made larger from the normal direction to the hologram recording layer 4, the color of a reproduced optical image to be visually perceived is shifted to a shorter wavelength side. For example, when the color of the reproduced optical image to be visually perceived from the normal direction is green, as the oblique angle to the normal direction becomes larger, the color of the reproduced optical image becomes a much more bluish color. The luminous sensitivity of human beings is maximum to green and is reduced to a color closer to blue. Therefore, as the observation direction of the observer 12 is more oblique to the normal direction, it is more difficult to observe the reproduced optical image as shown in FIG. 7B.

As described above, in the case where the interference fringes 5 are formed in the hologram recording layer 4 by making the coherent light L1 of the predetermined wavelength incident along the normal direction to the hologram recording layer 4, and when the point light source 11 is observed through the predetermined region including the formation region of the interference fringes 5 from a direction oblique to the normal direction, the point light source 11 is observed with a color (for example, a blue-based color) shifted to a shorter wavelength side than the wavelength of color used for forming the interference fringes 5, so that visual perception may be reduced.

FIG. 8 is a drawing showing another example of forming the interference fringes 5 in the hologram recording layer 4. In FIG. 8, the coherent light L1 of the predetermined wavelength is made incident on the volume hologram recording material 8 along a direction oblique to the normal direction to the volume hologram recording material 8 to form the interference fringes 5 inside the volume hologram recording material 8. When comparing the case where the coherent light L1 is incident on the volume hologram recording material 8 from the normal direction and the case where the coherent light L1 is incident on the volume hologram recording material 8 from a direction oblique to the normal direction, even with the same wavelength for the incident coherent light L1, the pitch of the interference fringes 5 in the normal direction becomes wider in the latter case. In other words, when the coherent light L1 is incident on the volume hologram recording material 8 from a direction oblique to the normal direction, the pitch of the interference fringes 5 in the normal direction becomes wider and, as the oblique angle to the normal direction is larger, the pitch of the interference fringes 5 in the normal direction further becomes wider.

FIG. 9A is a drawing showing an example in which the point light source 11 is observed through the predetermined region including the formation region of the interference fringes 5 from the same direction as the incidence direction of the coherent light L1 in forming the interference fringes 5 of FIG. 8. In this case, as shown in FIG. 9B, the reproduced optical image is visually perceived with the color of the same wavelength as the coherent light used for forming the interference fringes 5.

Figures 10A, 10B:
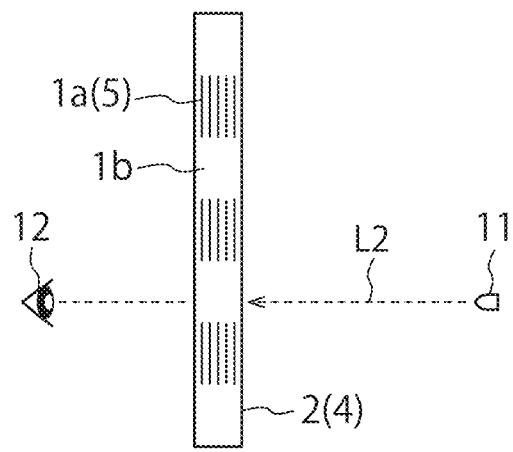
FIG. 10A is a drawing showing a method of observing the hologram recording layer of FIG. 8 from a normal direction.
FIG. 10B is a drawing showing an example of the reproduced optical image of FIG. 10A.

FIG. 10A is a drawing showing an example in which the point light source 11 is observed through the predetermined region including the formation region of the interference fringes 5 from the normal direction to the hologram recording layer 4 formed with the interference fringes 5 of FIG. 8. In this case, as shown in FIG. 10B, the color of the reproduced optical image is shifted to a color of a longer wavelength side than the predetermined wavelength. For example, in the case where the color of the wavelength of the coherent light used for forming the interference fringes 5 is green, and when the point light source 11 is observed through the predetermined region along the normal direction, the point light source 11 is visually perceived with a reddish color such as an orange color. Reddish colors give higher luminous sensitivity than blue-based colors, so that visual perception is better than the case where the point light source 11 is observed with a blue-based color.

As described above, when the interference fringes 5 are formed in the volume hologram recording material 8, for example, by making coherent light L1 of the predetermined wavelength of green incident, not along the normal direction, but along a direction oblique to the normal direction, the angle range for the reproduced optical image to be visually perceived can be widened.

The example explained in the above is that, when the reproduced optical image of the interference fringes 5 formed in the hologram recording layer 4 is observed, the hologram recording layer 4 is observed from the surface side thereof opposite to the surface side thereof where the point light source 11 is disposed. However, the point light source 11 may be disposed on the same surface side as the observer 12.

Figure 11A:
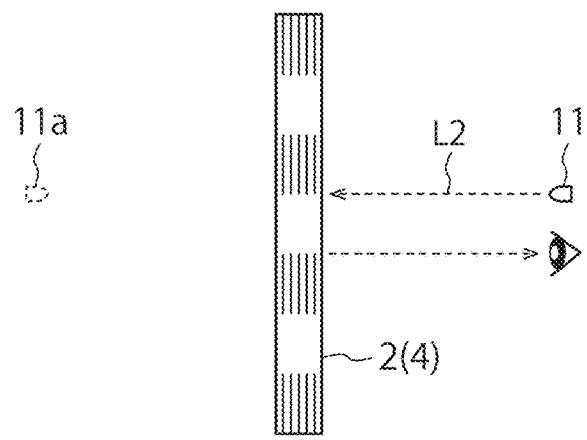
FIG. 11A is a drawing showing an example in which a point light source is disposed on the same surface side as an observer, to be observed in a normal direction.
Figure 11B:
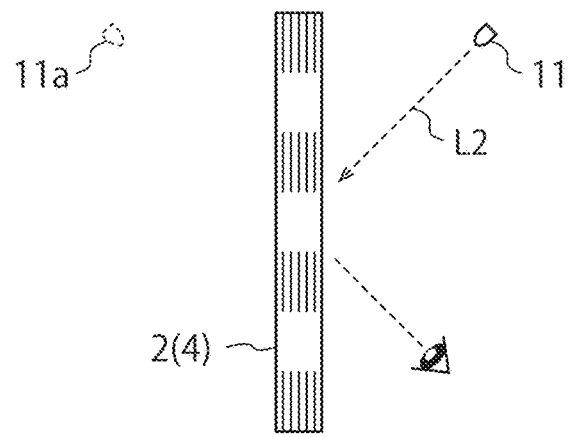
FIG. 11B is a drawing showing an example in which a point light source is disposed on the same surface side as an observer, to be observed in an oblique direction.

FIGS. 11A and 11B are drawings showing examples in which the point light source 11 is disposed on the same surface side as the observer 12 to observe a reproduced optical image. In the examples of FIGS. 11A and 11B, an LED is used as the point light source 11. When illumination light by means of the point light source 11 is made incident on the hologram recording layer 4 and a reflected image of the point light source 11 caused by the hologram recording layer 4 is observed from a direction of regular reflection of the point light source 11 caused by the hologram recording layer 4, a reproduced optical image can be visually perceived at a position 11a of plane symmetry with the point light source 11 with respect to the hologram recording layer.

Figure 12:
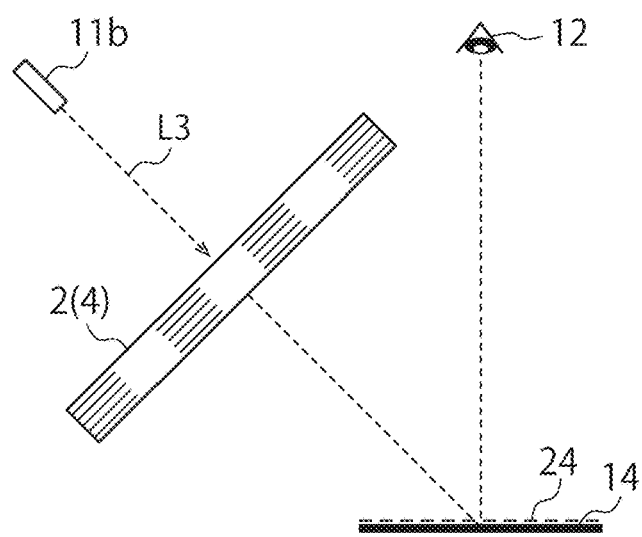
FIG. 12 is a drawing showing an example in which a laser pointer is disposed to observe a reproduced optical image.

FIG. 12 shows an example in which a laser pointer 11b for emitting coherent light L3 is used as the point light source 11. In the case where the interference fringes 5 are formed in the volume hologram recording material 8 by making the coherent light L1 incident on the volume hologram recording material 8 along the normal direction, by making the coherent light L1 incident on the hologram recording layer 4 from the laser pointer 11b also along the normal direction to the hologram recording layer 4, a reproduced image 24 can be projected onto a predetermined projection plane 14 with the color of the predetermined wavelength on the opposite surface side of the hologram recording layer 4. The observer 12 can visually perceive the reproduced image 24 by observing the projection plane without through the predetermined region of the light control part 1a and the light transmitter 1b in the hologram recording layer 4.

In the examples in the above-described embodiment, the interference fringes 5 that reflect light in the predetermined wavelength are formed in the hologram recording layer 4. However, instead of forming the interference fringes 5, a predetermined-wavelength absorbing layer including a predetermined-wavelength absorbing coloring matter for absorbing the light in the predetermined wavelength may be formed on the base material layer. For example, in order to visually perceive a green-color optical image when the point light source is observed through the optical member 2, a predetermined-wavelength absorbing layer including a predetermined-wavelength absorbing coloring matter for absorbing a green wavelength component as the predetermined wavelength may be formed on the base material layer in accordance with a Fourier-transformed image, and then the formed region is set as the predetermined region through which a reproduced optical image is observable. In this case, the portion having the predetermined-wavelength absorbing coloring matter is the light control part 1a whereas the portion without the predetermined-wavelength absorbing coloring matter is the light transmitter 1b.

In order to form the predetermined-wavelength absorbing coloring matter on the base material layer in accordance with the Fourier-transformed image, it is considered to form ink including the predetermined-wavelength absorbing coloring matter on the base material layer using a printing technique such as Gravure printing, off-set printing, screen printing, etc. As specific examples of the predetermined-wavelength absorbing coloring matter, tetraazaporphyrin, cyanine-based coloring matter, azomethine-based coloring matter, rhodamine-based coloring matter, etc., used for color filters and the like, can be used. As the base material layer, a resin film of polyethylene terephthalate, polycarbonate, acrylic resin, cycloolefin resin, polyester resin, polystyrene resin, acrylic-styrene resin, etc. or quartz glass, having a high transmission factor but a small haze value, are used.

The half width of spectral transmittance that represents the width of the predetermined wavelength passing through the predetermined-wavelength absorbing coloring matter to be formed on the base material layer is desirably 100 nm or less, and more preferably, 50 nm or less desirably, in order to improve color recognition performance to obtain a clearly reproduced optical image.

Figure 13:
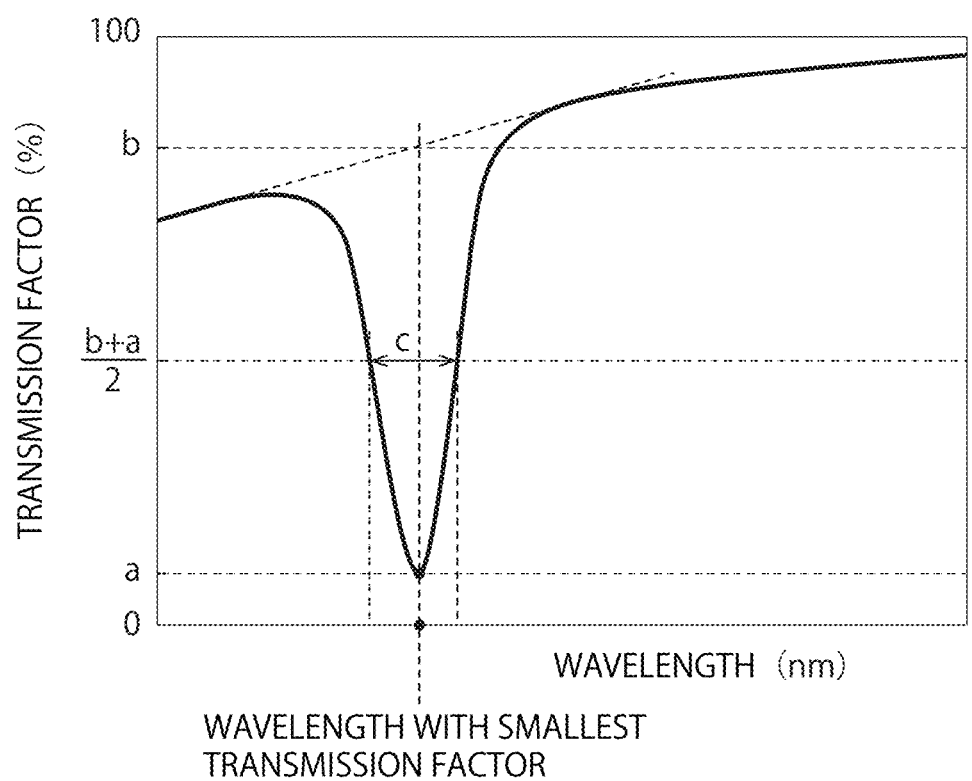
FIG. 13 is a graph indicating a half width of spectral transmittance.

FIG. 13 is a graph showing spectral transmittance distribution of the light control part 1a. In FIG. 13, the abscissa is wavelength (nm) and the ordinate is transmission factor (%). The light control part 1a in FIG. 13 is the interference fringe 5, the dielectric multilayer, or the predetermined-wavelength absorbing coloring matter, etc. The above-described half width (full width at half maximum) c is defined as the difference between wavelengths before and after, and closest to a wavelength at which a transmission factor becomes smallest, the transmission factor being (b+a)/2 where b is a transmission factor (%) of the optical member 2, the transmission factor being assumed when the light control part 1a is not formed, in the wavelength at which the transmission factor becomes smallest, and a is a transmission factor (%) of the optical member 2 in the wavelength at which the transmission factor becomes smallest.

As described above, the light modulation element 1 according to the present embodiment can select the color of a reproduced optical image to be visually perceived by controlling the incidence direction or wavelength of a laser beam to be used for forming the interference fringes 5 in the volume hologram recording material 8. Therefore, by using two or more types of laser beams with different wavelengths in forming the interference fringes 5, a reproduced optical image of two or more kinds of colors can be visually perceived.

Figure 14:
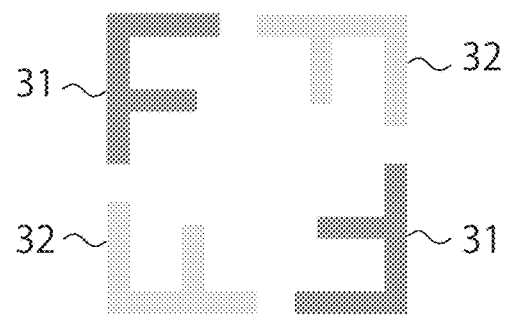
FIG. 14 is a drawing showing an example of a reproduced optical image including two different colors from each other.

FIG. 14 shows an example of a reproduced optical image including two different colors from each other. In FIG. 14, the letters "F" with different tone practically represent different colors. In more specifically, for example, red-"F" 31 and green-"F" 32 are diagonally arranged. The light modulation element 1 that can reproduce the reproduced optical image of FIG. 14 can be produced with the procedure shown in FIG. 2 and FIGS. 3A to 3C. In more specifically, by forming a volume hologram, by which a reproduced optical image of red is obtained, using a photomask substrate 7 for red-"F" and also a volume hologram, by which a reproduced optical image of green is obtained, using a photomask substrate 7 for green-"F", to produce a hologram recording layer 4 having the two volume holograms stacked to each other, and then by irradiating the hologram recording layer 4 with a laser beam including red and green wavelength components, a reproduced optical image of red and green can be obtained. Or after forming interference fringes in the hologram recording material 8 by irradiation with a laser beam including a red wavelength component in the state where one photomask substrate 7 is disposed in a predetermined orientation, by irradiating the photomask substrate 7 with a laser beam including a green wavelength component in the state where the photomask substrate 7 is shifted from the predetermined orientation, other interference fringes may be formed in the hologram recording material 8.

As described above, the light control part 1a in the light modulation element 1 for obtaining the reproduced optical image of FIG. 14 makes an observer visually perceive a reproduced optical image of two different colors from each other when the point light source is observed through the predetermined region including the interference fringes in the hologram recording layer 4 from the normal direction to the optical member 2 in the state where light in the predetermined wavelength range including two wavelengths is incident from the point light source on the predetermined region.

Figure 15A:
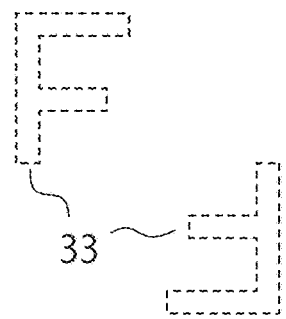
FIG. 15A is a drawing showing a first example of a reproduced optical image by means of three or more laser beams having different wavelengths.

FIG. 15A shows a first example of a reproduced optical image of the light modulation element 1 produced using three or more laser beams having different wavelengths from one another. The reproduced optical image of FIG. 15A represents white-"F" 33. This reproduced optical image is observed with a white color as a result of the mixture of light diffracted at each of three or more interference fringes formed in the light modulation element 1 when reproduction illumination light including all wavelength components of the three or more laser beams used in production is emitted to the light modulation element 1. The combined color of the reproduced optical image can be changed to any color other than white by adjusting the wavelength of the three or more laser beams used for forming the three or more interference fringes.

The light modulation element 1 for obtaining the reproduced optical image of FIG. 15A can be produced by, for example, preparing three or more photomask substrates 7 corresponding to three or more wavelength components, respectively, and forming three or more interference fringes in the volume hologram recording medium 8 while changing the photomask substrate 7 per wavelength. Or a plurality of photomask substrates 7 corresponding to the three or more wavelength components, respectively, may be used to produce a plurality of volume holograms for obtaining a reproduced optical image of a plurality of colors and to stack these volume holograms. By irradiating the stacked hologram recording layer 4 simultaneously with laser beams of the same wavelengths as the wavelengths used in recording, a white-color reproduced optical image can be obtained. The laser beams for obtaining the white reproduced optical image as shown in FIG. 15A may be three or more laser beams of wavelengths of red, green and blue or three or more laser beams of wavelengths of other colors.

As described above, the light control part 1a in the light modulation element 1 for obtaining the reproduced optical image of FIG. 15A makes an observer visually perceive a white reproduced optical image when the point light source is observed through the predetermined region from the normal direction to the optical member 2 in the state where light in the predetermined wavelength range including three or more wavelengths is incident on the predetermined region the interference fringes in the hologram recording layer 4 from the point light source.

Figure 15B:
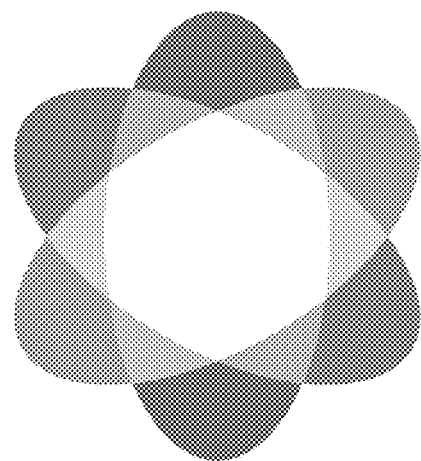
FIG. 15B is a drawing showing a second example of a reproduced optical image by means of three or more laser beams having different wavelengths.

FIG. 15B shows a second example of a reproduced optical image of the light modulation element 1 produced using three or more laser beams having different wavelengths from one another. The reproduced optical image of FIG. 15B is colored separately with three or more colors. The regions with different tone in FIG. 15B indicate different colors.

The light modulation element 1 of FIG. 15B is produced by using three photomask substrates 7 corresponding the three colors to form three volume holograms for obtaining a reproduced optical image of a plurality of colors and stacking the volume holograms. By irradiating the light modulation element 1 of FIG. 15B with three or more laser beams including wavelength components of respective colors, a plurality of reproduced optical images to be illuminated with one or more colors can be obtained. Or the light modulation element 1 of FIG. 15B may be produced by, while shifting the arrangement location of one photomask substrate 7, irradiating the photomask substrate 7 with laser beams of different wavelengths for respective arrangement locations to form the interference fringes in the hologram recording medium 8.

As described above, the light control part 1a in the light modulation element 1 for obtaining the reproduced optical image of FIG. 15B makes an observer visually perceive a reproduced optical image colored separately with three or more colors when the point light source is observed through the predetermined region from the normal direction to the optical member 2 in the state where light in the predetermined wavelength range including three or more wavelengths is incident on the predetermined region including the interference fringes in the hologram recording layer 4 from the point light source.

The light modulation element 1 according to the present embodiment can be combined with an existing light modulation element with which a two-dimensionally or a three-dimensionally reproduced optical image emerges. In this case, for example, the hologram recording layer 4 recorded with the interference fringes 5 of the present embodiment and an existing hologram recording layer with which a two-dimensionally or a three-dimensionally reproduced optical image (also referred to as a Lippmann-hologram reproduced image) emerges may be stacked to each other. Or interference fringes in the existing hologram recording layer with which a two-dimensionally or a three-dimensionally reproduced optical image emerges may be formed apart from or simultaneously with the interference fringes 5, in the hologram recording layer 4 according to the present embodiment.

For example, the light modulation element 1 according to the present embodiment may be provided with, not only the hologram recording layer 4 produced with the procedure of FIG. 2 and FIGS. 3A to 3C (or FIGS. 5A to 5C), but also the interference fringes for reproduction of the Lippmann-hologram reproduced image. The interference fringes for reproduction of the Lippmann-hologram reproduced image may be formed by being overlapped with the hologram recording layer 4 formed with the interference fringes for reproduction of a reproduced optical image in accordance with the reproduction reference image such as the Fourier-transformed image or may be formed in a recording material layer different from the hologram recording layer 4.

Figure 16A:
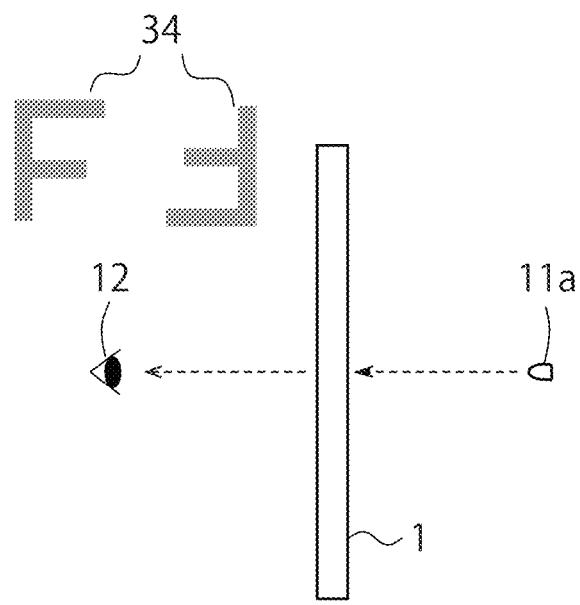
FIG. 16A is a drawing explaining a method for reproduction of a reproduced optical image in accordance with a reproduction reference image.
Figure 16B:
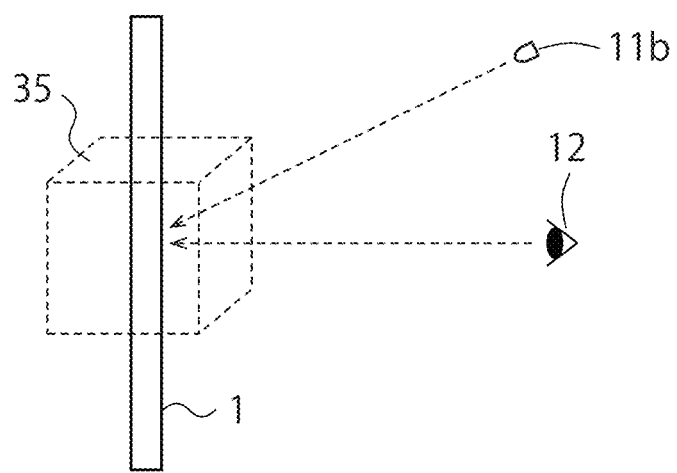
FIG. 16B is a drawing explaining a method for reproduction of a Lippmann-hologram reproduced image.

FIGS. 16A and 16B are drawings for explaining a reproduction method for this type of light modulation element 1. Reproduction illumination light for reproduction of a reproduced optical image 34 in accordance with the reproduction reference image is different from reproduction illumination light for reproduction of a Lippmann-hologram reproduced image 35. In more specifically, the reproduction illumination light for reproduction of the reproduced optical image 34 in accordance with the reproduction reference image is light from a point light source 11a disposed apart from one main surface of the light modulation element 1 as shown in FIG. 16A. The observer observes the reproduced optical image 34 from the opposite surface side to the one main surface of the light modulation element 1 while the point light source 11a is on. On the other hand, the reproduction illumination light for reproduction of the Lippmann-hologram reproduced image 35 is emitted in a direction oblique to the normal direction to the one main surface of the light modulation element 1 from another point light source 11b disposed at a position apart from the one main surface of the light modulation element 1. The observer observes the Lippmann-hologram reproduced image 35 from the normal direction to the one main surface. The Lippmann-hologram reproduced image 35 can be visually perceived not only with the point light source 11b but also with another illumination source such as a fluorescent lamp.

The Lippmann-hologram reproduced image 35 is observed from the normal direction to the one main surface by being illuminated with light emitted in a direction oblique to the normal direction. In other words, while the Lippmann-hologram reproduced image 35 is observed from a direction apart from the direction of light source, the reproduced optical image 34 in accordance with the reproduction reference image can be observed from the direction of the point light source. Therefore, there is no possibility that the Lippmann-hologram reproduced image 35 and the reproduced optical image 34 in accordance with the reproduction reference image are combined to be observed, so that both reproduced images can be observed as being clearly distinguished from each other. Whereas the reproduction illumination light for reproduction of the Lippmann-hologram reproduced image 35 may be the point light source 11b or another illumination source as described above, in order for reproduction of the reproduced optical image 34 in accordance with the reproduction reference image, for example, it is required to dispose the point light source 11a on the opposite side of the light modulation element 1 with respect to the observer as shown in FIG. 16A. Or, as shown in FIGS. 11A and 11B, although the reproduced optical image 34 can be reproduced when the observer observes on the same side as the point light source 11a, in this case, the observer is required to observe from the direction of regular reflection of light from the point light source 11a. As described above, in order for reproduction of the reproduced optical image 34 in accordance with the reproduction reference image, the position of the point light source 11a and the observer's observing direction have to satisfy the predetermined requirements, thus suitable for use in security such as anti-counterfeiting.

The master plate for reproduction of the Lippmann-hologram reproduced image 35 is produced, for example, by an existing 2-step method (also referred to as an H1H2 method). For example, in the production method of FIGS. 5A to 5C, the master plate produced by the H1H2 method is stacked on a photomask substrate and irradiated with a laser beam of a predetermined wavelength from a predetermined direction to form a volume hologram. Or the master plate produced by the H1H2 method may be used to form interference fringes in the volume hologram recording medium 8, and using the formed volume hologram recording medium 8, a final hologram recording layer 4 may be formed in the procedure of FIGS. 3A to 3C or FIGS. 5A to 5C.

The color of the Lippmann-hologram reproduced image 35 can be controlled with the wavelength of a laser beam for forming the interference fringes. The reproduction illumination light to be emitted in reproduction of the Lippmann-hologram reproduced image 35 is required to include a wavelength component of reference light used in forming the interference fringes.

As described above, by adjusting the wavelength of the laser beam to be used for forming the interference fringes corresponding to the reproduced optical image 34 in accordance with the reproduction reference image and the wavelength of the laser beam to be used for forming the interference fringes corresponding to the Lippmann-hologram reproduced image 35, the reproduced optical image 34 in accordance with the reproduction reference image and the Lippmann-hologram reproduced image 35 can be colored with the same color or different colors. The kind of colors is also freely adjustable.

Figure 17:
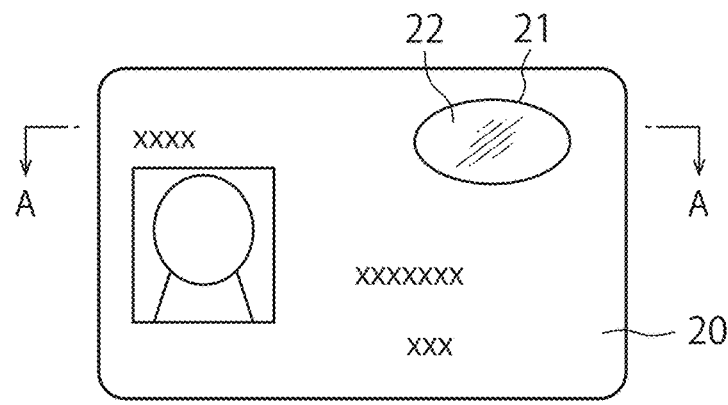
FIG. 17 is a drawing showing an example of an information recording medium.

The light modulation element 1 according to the present embodiment can be built in an information recording medium. FIG. 17 is a drawing showing an example of an information recording medium 20. The information recording medium 20 of FIG. 17 is a bill, an ID certificate, a passport, a cash voucher, a ticket, a medium recorded with a variety of types of information such as personal identifiable information and confidential information in an official document, a monetary valuable medium, etc. The ID certificate is a national ID certificate, a license, a membership card, an employee ID card, a student ID card, etc. The base material of the medium of FIG. 17 is paper, resin, metal, synthetic fiber, etc. The base material of FIG. 17 is provided with an opening 21 having a transparent member 22 provided on at least part of the opening 21, the transparent member 22 being recorded with security information such as letters, symbols, and patterns, as a Fourier-transformed image. The opening 21 may be entirely covered with the transparent member 22 or may have the transparent member 22 disposed on at least part thereof. This transparent member 22 corresponds to the light modulation element 1 according to the present embodiment. For example, a point light source is disposed on the rear surface side of the information recording medium 20 of FIG. 17 and then the point light source is observed through the transparent member 22 by an observer on the front surface side, so that the security information recorded in the transparent member 22 can be visually perceived. The security information can be used for, for example, authenticity determination of the information recording medium 20.

Figure 18A:
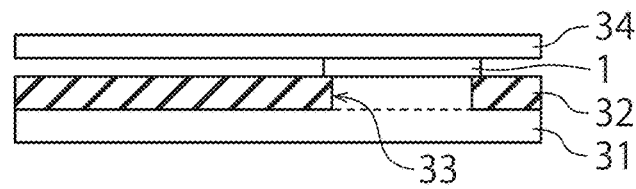
FIG. 18A is a drawing showing a first example of the sectional configuration of the information recording medium taken on line A-A of FIG. 17.

FIG. 18A is a drawing showing a first example of the sectional configuration of the information recording medium 20 taken on line A-A of FIG. 17. The information recording medium 20 shown in FIG. 18A has an opaque resin layer 32 disposed on a transparent resin layer 31. The opaque resin layer 32 has an opening 33 in a region overlapped with the opening 21. On the opening 33, the above-described light modulation element 1 is disposed and a transparent resin layer is disposed thereon. Accordingly, by illuminating the opening 21 with light from the point light source, a reproduced image in accordance with the Fourier-transformed image formed in the light modulation element 1 can be visually perceived. The opening 33 may be formed by making a hole in the opaque resin layer 32 or, after making the hole in the opaque resin layer 32, by putting in the hole a transparent resin layer having almost the same shape as the hole. Although FIG. 18A is drawn as if there is a gap between the transparent resin layer 34 and the opaque resin layer 32, in use as the information recording medium 20, the transparent resin layer 34 and the opaque resin layer 32 are fused by applying heat or pressure, or bonded with an adhesive not shown.

Figure 18B:
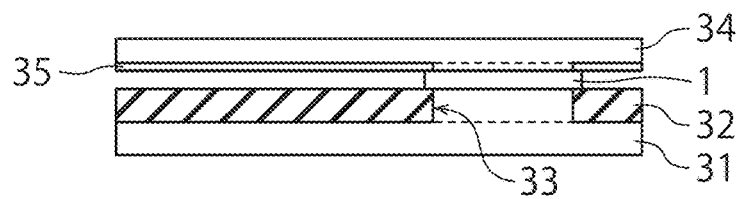
FIG. 18B is a drawing showing a second example of the sectional configuration of the information recording medium taken on line A-A of FIG. 17.

FIG. 18B is a drawing showing a second example of the sectional configuration of the information recording medium 20 taken on line A-A of FIG. 17. The information recording medium 20 shown in FIG. 18B is different from FIG. 18A in that a print layer 35 is disposed on the rear surface side of the transparent resin layer 34. The print layer 35 is disposed on the rear surface of the transparent resin layer 34 in a region not overlapping with the opening 21. In other words, the opening 21 is provided in a region overlapping with the portion where the print layer 35 is not disposed. The print layer 35 may be disposed, not on the rear surface side, but on the front surface side of the transparent resin layer 34. Also in FIG. 18B, the transparent resin layer 34 and the opaque resin layer 32 may be fused by applying heat or pressure, or bonded with an adhesive not shown.

Figure 18C:
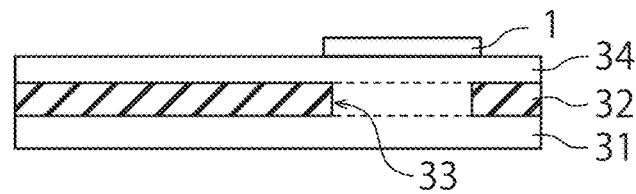
FIG. 18C is a drawing showing a third example of the sectional configuration of the information recording medium taken on line A-A of FIG. 17.

FIG. 18C is a drawing showing a third example of the sectional configuration of the information recording medium 20 taken on line A-A of FIG. 17. In the information recording medium 20 shown in FIG. 18C, the opaque resin layer 32 is disposed on the transparent resin layer 31, and on the opaque resin layer 32, the transparent resin layer 34 is disposed. On the transparent resin layer 34, the light modulation element 1 is disposed so as to match with the position of the opening 21. In the opaque resin layer 32, the opening 33 is provided in a region overlapping with the opening 21.

Figure 18D:
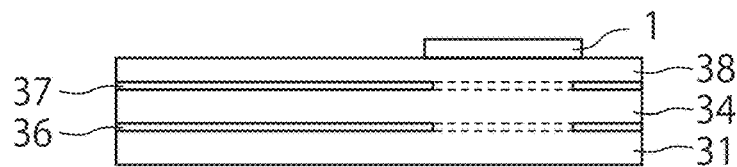
FIG. 18D is a drawing showing a fourth example of the sectional configuration of the information recording medium taken on line A-A of FIG. 17.

FIG. 18D is a drawing showing a fourth example of the sectional configuration of the information recording medium 20 taken on line A-A of FIG. 17. In the information recording medium 20 shown in FIG. 18D, a print layer 36 is disposed on the transparent resin layer 31 in a region not overlapping with the opening 21. On the print layer 36, the transparent resin layer 34 is formed, and a print layer 37 is formed on the transparent resin layer 34 in a region not overlapping with the opening 21. A transparent resin layer 38 is disposed on the print layer 37, and on the transparent resin layer 38, the light modulation element 1 is disposed so as to match with the position of the opening 21. In other words, the opening 21 is provided in a location overlapping with a portion in which the print layers 36 and 37 are not arranged. Also in FIG. 18D, the transparent resin layers 31, 34 and 38 may be fused by applying heat or pressure or bonded with an adhesive not shown.

Figure 19:
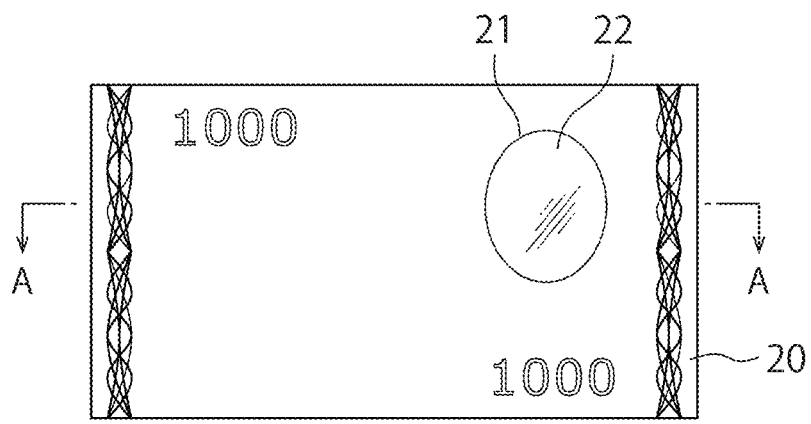
FIG. 19 is a drawing showing another example of the information recording medium.

FIG. 19 is a drawing showing another example of the information recording medium 20. The information recording medium 20 of FIG. 19 is a bill. The bill of FIG. 19 is provided with the opening 21. The opening 21 is provided with the transparent member 22 in at least part of the opening 21, the transparent member 22 being recorded with security information such as letters, symbols, and patterns, as a Fourier-transformed image.

Figure 20A:
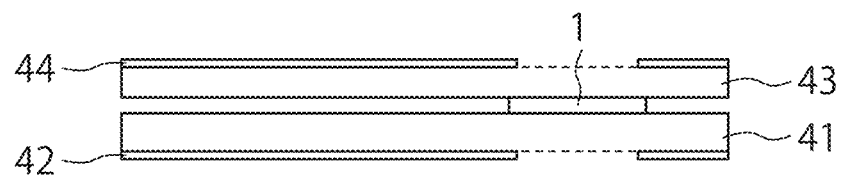
FIG. 20A is a drawing showing a first example of the sectional configuration taken on line A-A of FIG. 19.

FIG. 20A is a drawing showing a first example of the sectional configuration taken on line A-A of FIG. 19. On the rear surface side of a transparent resin layer 41, a print layer 42 is disposed in a region not overlapping with the opening 21. On the front surface side of the transparent resin layer 41, the light modulation element 1 is disposed in a region overlapping with the opening 21. A transparent resin layer 43 is disposed on the light modulation element 1. On the transparent resin layer 43, a print layer 44 is disposed in a region not overlapping with the opening 21. In other words, the opening 21 is provided in a location overlapping with a portion in which the print layers 42 and 44 are not arranged. Also in FIG. 20A, the transparent resin layers 41 and 43 may be fused by applying heat or pressure or bonded with an adhesive not shown.

Figure 20B:
FIG. 20B is a drawing showing a second example of the sectional configuration taken on line A-A of FIG. 19.

FIG. 20B is a drawing showing a second example of the sectional configuration taken on line A-A of FIG. 19. On the rear and front surface sides of the transparent resin layer 41, the print layers 42 and 44 are arranged, respectively, in a region not overlapping with the opening 21. The light modulation element 1 is disposed in a region overlapping with an opening on the front surface side of the transparent resin layer 41. In other words, the opening 21 is provided in a location overlapping with a portion in which the print layers 42 and 44 are not arranged.

The light modulation element 1 according to the present embodiment enables visual authenticity determination only with a compact point light source 11 such as an easily-obtainable LED light. Moreover, the light modulation element 1 according to the present embodiment has a feature in that authenticity determination can be done by checking a reproduced optical image of the color of the predetermined wavelength, different from the conventional rainbow color. Furthermore, the light modulation element 1 according to the present embodiment has a feature in that the color of the reproduced optical image is varied by changing the incidence direction of the point light source 11 to the light modulation element 1, so that authenticity determination can be done more accurately. Moreover, the light modulation element 1 according to the present embodiment has a feature in that, since the half width of spectral transmittance of the optical member 2 is narrow such as 100 nm or less, more preferably, 50 nm or less, a reproduced optical image is clear and visually perceived easily, so that authenticity determination is easily possible. Furthermore, the light modulation element 1 according to the present embodiment has a high transmission factor, so that the scene beyond the opening 21 of the information recording medium 20 can be easily observed through the opening 21.

As described above, the present embodiment is provided with the optical member 2 having the light control part 1a and the light transmitter 1b in accordance with the Fourier-transformed image 10 of an original image. The light control part 1a reflects or absorbs light in the predetermined wavelength but passes light in other than the predetermined wavelength through, so that the color of a reproduced optical image, when the predetermined region including the light control part 1a and the light transmitter 1b in the optical member 2 is observed using the point light source 11, becomes a monochromatic color and hence the reproduced optical image can easily be visually perceived. In other words, the light modulation element 1 according to the present embodiment has less chromatic dispersion in a reproduced optical image, so that contours of the reproduced optical image become clear to enable visual perception of a clearly reproduced optical image.

According to the present embodiment, by adjusting the incidence direction or wavelength of the coherent light L1 to be used in forming the interference fringes 5 in the hologram recording layer 4 that forms the optical member 2, the color of a reproduced optical image can be controlled and also the angle range in which the reproduced optical image is visually perceived clearly can be controlled.

Moreover, according to the present embodiment, by varying the angle at which a point light source is observed through the optical member 2, a reproduced optical image can be visually perceived with different colors.

Furthermore, according to the present embodiment, the point light source 11 may be disposed on the opposite surface side of the optical member 2 with respect to the observer 12 or on the same surface side as the observer 12 when observing a reproduced optical image, which results in a higher degree of freedom of the location of the point light source 11.

The aspect of the present disclosure is not limited to each of the above-described embodiments, but includes a variety of modifications conceivable by those skilled in the art. The effects of the present disclosure are also not limited to the above description. In other words, various additions, changes and partial omissions may be made without departing from the conceptual ideas and gist derived from the contents defined in claims and their equivalents.

The invention claimed is:

1. A light modulation element comprising:
a hologram recording layer, the hologram recording layer comprising:
a light control part configured to reflect or absorb light in a predetermined wavelength range and to pass through light in other than the predetermined wavelength range in at least a visible light range in accordance with a reproduction reference image for reproducing an original image, the light control part comprising an interference fringe; and
a light transmissive part configured to pass through light in at least the visible light range including the predetermined wavelength range,
wherein the reproduction reference image is a Fourier-transformed image of the original image, and
the light control part and the light transmissive part are disposed adjacently in a plane direction in an alternating pattern depending on a fringe pattern of the Fourier-transformed image.

2. The light modulation element of claim 1, wherein the interference fringe is disposed in a depth direction of the light control part.

3. The light modulation element of claim 1, wherein the light control part is the interference fringe in the hologram recording layer.

4. The light modulation element of claim 3, wherein the hologram recording layer is configured to make an observer visually perceive a reproduced optical image of a color of the predetermined wavelength range when a point light source is observed through a predetermined region including the interference fringe in the hologram recording layer from a normal direction to the hologram recording layer in a state where light in the predetermined wavelength range is incident from the point light source on the predetermined region, and make an observer visually perceive a reproduced optical image of a color of a shorter wavelength than the predetermined wavelength range when the point light source is observed through the predetermined region from a direction oblique to the normal direction.

5. The light modulation element of claim 3, wherein the hologram recording layer is configured to make an observer visually perceive a reproduced optical image of a color of the predetermined wavelength range when a point light source is observed through a predetermined region including the interference fringe in the hologram recording layer from a direction oblique to a normal direction to the hologram recording layer in a state where light in the predetermined wavelength range is incident from the point light source on the predetermined region, and make an observer visually perceive a reproduced optical image of a color of a longer wavelength than the predetermined wavelength range visually perceived when the point light source is observed through the predetermined region from a direction closer than the oblique direction to the normal direction.

6. The light modulation element of claim 1, wherein a half width of spectral transmittance in the predetermined wavelength range is 100 nm or less in a state where light in the predetermined wavelength range is incident from a point light source on the hologram recording layer along a normal direction to the hologram recording layer.

7. The light modulation element of claim 1, wherein the predetermined wavelength range includes two wavelengths different from each other,
the light control part reflects light in each of the two wavelengths, and
a light transmitter passes through light in the two wavelengths.

8. The light modulation element of claim 7,
wherein the hologram recording layer is configured to make an observer visually perceive a reproduced optical image of two colors different from each other when a point light source is observed through the predetermined region including the interference fringe in the hologram recording layer from a normal direction to the hologram recording layer in a state where light in the predetermined wavelength range including the two wavelengths is incident from the point light source on the predetermined region.

9. The light modulation element of claim 1, wherein the predetermined wavelength range includes three or more wavelengths different from one another,
the light control part reflects light in each of the three or more wavelengths, and
a light transmitter passes through light in the three wavelengths.

10. The light modulation element of claim 9,
wherein the hologram recording layer is configured to make an observer visually perceive a reproduced optical image of a white color when a point light source is observed through the predetermined region including the interference fringe in the hologram recording layer from a normal direction to the hologram recording layer in a state where light in the predetermined wavelength range including the three or more wavelengths is incident from the point light source on a predetermined region.

11. The light modulation element of claim 9,
wherein the hologram recording layer is configured to make an observer visually perceive a reproduced optical image colored separately with the three or more colors when a point light source is observed through the predetermined region including the interference fringe in the hologram recording layer from a normal direction to the hologram recording layer in a state where light in the predetermined wavelength range including the three or more wavelengths is incident from the point light source on the predetermined region.

12. The light modulation element of claim 1 wherein the light control part comprises a first interference fringe converted into a Lippmann-hologram reproduced image when second reproduction illumination light, different from first reproduction illumination light to be incident on the hologram recording layer, is incident on the hologram recording layer.

13. The light modulation element of claim 12, wherein the light control part comprises the first interference fringe and a second interference fringe functioning as the light control part.

14. The light modulation element of claim 1 wherein the light control part comprises a first interference fringe converted into a Lippmann-hologram reproduced image of a color different from a color of a reproduced optical image reproduced by the hologram recording layer with first reproduction illumination light incident on the hologram recording layer, when second reproduction illumination light different from the first reproduction illumination light is incident on the hologram recording layer.

15. An information recording medium comprising the light modulation element of claim 1.

16. The information recording medium of claim 15, wherein the original image includes at least one information of a letter, a symbol and a pattern.

17. The information recording medium of claim 15 comprising a base material having an opening of a predetermined size,
wherein at least part of the light modulation element is disposed in the opening.

* * * * *